(12) United States Patent
Profit et al.

(10) Patent No.: US 10,486,988 B2
(45) Date of Patent: Nov. 26, 2019

(54) DEVICE AND METHOD FOR TREATING A LIQUID CONTAINING AN ORGANIC POLLUTANT

(71) Applicant: ISB WATER, La Celle-Saint-Cloud (FR)

(72) Inventors: Grégoire Profit, Sevres (FR); Alexandre Profit, Meudon (FR)

(73) Assignee: ISB WATER, La Celle-Saint-Cloud (FR)

( * ) Notice: Subject to any disclaimer, the term of this patent is extended or adjusted under 35 U.S.C. 154(b) by 513 days.

(21) Appl. No.: 15/113,382

(22) PCT Filed: Jan. 21, 2015

(86) PCT No.: PCT/IB2015/050464
§ 371 (c)(1),
(2) Date: Jul. 21, 2016

(87) PCT Pub. No.: WO2015/110967
PCT Pub. Date: Jul. 30, 2015

(65) Prior Publication Data
US 2017/0008779 A1    Jan. 12, 2017

(30) Foreign Application Priority Data
Jan. 21, 2014  (FR) ...................... 14 50489

(51) Int. Cl.
*C02F 1/36* (2006.01)
*C02F 1/467* (2006.01)
(Continued)

(52) U.S. Cl.
CPC .............. *C02F 1/4672* (2013.01); *C02F 1/36* (2013.01); *C02F 2001/46133* (2013.01);
(Continued)

(58) Field of Classification Search
CPC ................ C02F 1/4672; C02F 1/36; C02F 2001/46133; C02F 2101/32; C02F 2305/026; C02F 2101/306; C02F 2103/10
See application file for complete search history.

(56) References Cited

U.S. PATENT DOCUMENTS

| 5,937,906 | A  |   | 8/1999 | Kozyuk |            |
|-----------|----|---|--------|--------|------------|
| 2005/0006313 | A1 | * | 1/2005 | Swinnen | ........... C02F 1/36 |
|           |    |   |        |        | 210/748.03 |

(Continued)

FOREIGN PATENT DOCUMENTS

| CN | 201567249 U  | 9/2010 |
|----|--------------|--------|
| EP | 0 680 457 B2 | 9/1999 |

(Continued)

OTHER PUBLICATIONS

Glaze et al., "The Chemistry of Water Treatment Processes Involving Ozone, Hydrogen Peroxide and Ultraviolet Radiation," Ozone Science & Engineering, 1987, vol. 9, pp. 335-352.

(Continued)

*Primary Examiner* — Walter D. Griffin
*Assistant Examiner* — Cameron J Allen
(74) *Attorney, Agent, or Firm* — Oliff PLC

(57) ABSTRACT

A device for treating a liquid including an organic pollutant, the device including: a device for injecting, into the liquid, microbubbles of an containing fluid containing an oxygenated constituent, the oxygenated constituent being capable of reacting with the ferrous cations $Fe^{2+}$ so as to generate hydroxyl radicals $OH°$ and hydrogen peroxide $H_2O_2$; a cavitation generator capable of generating bubbles in the liquid by cavitation; a bubble implosion chamber; a generator of ferrous cations $Fe^{2+}$, the cavitation bubble implosion chamber being placed in a region in which the liquid contains the ferrous cations.

14 Claims, 2 Drawing Sheets

(51) Int. Cl.
  *C02F 101/32* (2006.01)
  *C02F 1/461* (2006.01)
  *C02F 101/30* (2006.01)
  *C02F 103/10* (2006.01)

(52) U.S. Cl.
  CPC .... *C02F 2101/306* (2013.01); *C02F 2101/32* (2013.01); *C02F 2103/10* (2013.01); *C02F 2305/026* (2013.01)

(56) References Cited

U.S. PATENT DOCUMENTS

2012/0043224 A1* 2/2012 Lopez .................. C02F 9/00 205/744
2015/0336112 A1* 11/2015 Ramirez ............... B01F 11/02 210/703

FOREIGN PATENT DOCUMENTS

| FR | 13 50513 A | 1/1964 | |
| WO | 98/50146 A1 | 11/1998 | |
| WO | 2011/033476 A1 | 3/2011 | |
| WO | 2012/161366 A1 | 11/2012 | |
| WO | WO-2012161366 A1 * | 11/2012 | ............... C02F 1/36 |

OTHER PUBLICATIONS

Brennen, Christopher E., "Cavitation and Bubble Dynamics," 1995, Oxford University Press, Inc, New York.
Suslick, Kenneth S., "Sonochemistry," Science, Mar. 23, 1990, vol. 247, pp. 1439-1445.
Shah et al., "Cavitation Reaction Engineering," Chemical Engineering, 1999, Plenum Publishers.
Apr. 16, 2015 International Search Report issued in International Patent Application No. PCT/IB2015/050464.

* cited by examiner

DEVICE AND METHOD FOR TREATING A LIQUID CONTAINING AN ORGANIC POLLUTANT

TECHNICAL FIELD

The invention relates to a device for the treatment of a liquid containing an organic pollutant.

STATE OF THE ART

Biological processes are widely used to treat liquids containing organic compounds. However, some organic compounds, known as "persistent organic pollutants" or "POP", are resistant to biodegradation and may even be toxic to the microorganisms used and reduce the effectiveness of these processes.

It is possible, in order to reduce these organic compounds, to employ adsorption or chemical oxidation processes. In particular, "advanced oxidation processes" (or AOPs), described by Glaze et al. [Glaze W. H., Kang and J. W. Chapin D. H., "*The chemistry of water treatment processes involving ozone, hydrogen peroxide and ultraviolet radiation. Ozone Sci. Eng.*, 9 (1987), 335-352], are processes for the treatment of water operating at ambient temperature and ambient pressure which result in the formation, in solution and in a high amount, of very powerful oxidizing agents, hydroxyl radicals (OH°). The AOP processes can include electrochemical processes for the production of OH° at the surface of an anode having high oxygen overvoltage under high current density, for example processes of anodic oxidation in the presence of $H_2O_2$.

Hydroxyl radicals OH° are advantageously highly reactive with organic compounds and are thus capable, by radical oxidation, of cleaving molecules of very stable organic compounds. In order to generate hydroxyl radicals, the Fenton process in particular consists of a decomposition of hydrogen peroxide ($H_2O_2$) by ferrous cations, according to the following reaction:

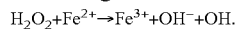
$$H_2O_2 + Fe^{2+} \rightarrow Fe^{3+} + OH^- + OH.$$

This process requires, in order to be effective, the maintenance of a pH between 2.0 and 4.0, with an optimum pH value of 2.8. Conventionally, a pH-regulating device thus has to be provided.

The use of such a regulation of the pH is expensive, technically difficult to carry out and always requires additional precautions in order to protect the equipment and the environment and to ensure the safety of the personnel.

Furthermore, the Fenton process involves an addition of $H_2O_2$, which is expensive and complex.

In addition, the reaction of the $Fe^{3+}$ ion with OFF results in the production of sludges formed by the hydroxides $Fe(OH)_3$.

In addition, the ferrous $Fe^{2+}$ cations are conventionally obtained by direct addition of a ferrous salt, especially $FeSO_4$, or of other solid iron(II) and iron(III) oxide compounds, such as hematite, goethite and magnetite. Dedicated and complex industrial subsystems thus have to be installed.

Finally, the efficiency of the Fenton process remains limited.

There thus exists a need for a novel treatment solution which makes it possible to overcome, at least partially, one or more of the abovementioned problems.

SUMMARY OF THE INVENTION

According to the invention, this aim is achieved by means of a device for the treatment of a liquid comprising an organic pollutant, said device comprising:

- a cavitation generator capable of generating, by cavitation, bubbles within said liquid,
- a chamber for implosion of said bubbles,
- a generator of ferrous $Fe^{2+}$ cations,
- a device for injection, into the liquid, of an oxygen-based fluid containing an oxygen-based constituent, the oxygen-based constituent being capable of reacting with the ferrous $Fe^{2+}$ cations in order to generate hydroxyl radicals.

According to the invention, the chamber for the implosion of the cavitation bubbles is positioned in a region in which the liquid contains said ferrous cations.

As it will be seen in more detail in the continuation of the description, surprisingly, such a device makes it possible, in a simple and efficient way, to efficiently treat the liquid with a reduced consumption of additives, indeed even without use of additives.

The cavitation generator generates bubbles which implode, creating an assembly of complex thermodynamic and chemical reactions. In particular, the implosion corresponds to a considerable local increase in the temperature and in the concentrations. These extreme local conditions would promote, inexplicably, the generation of the hydroxyl radicals by reaction of the ferrous $Fe^{2+}$ cations and of the oxygen-based constituent.

A treatment device according to the invention can also comprise one or more of the following optional characteristics:

- the cavitation generator is configured so that more than 50% by number of the cavitation bubbles generated exhibit a diameter between 40 μm and 5 mm, preferably of between 20 μm and 2 mm;
- the cavitation generator is chosen from the group consisting of a passive reactor (that is to say that the cavitation results from a sudden reduction in the pressure within the liquid by acceleration of this liquid), an ultrasonic generator and their combinations;
- the cavitation generator does not comprise a motor. More preferably, it does not comprise a moving part;
- the implosion chamber is preferably positioned at a distance of less than 0.5 m from, of less than 0.3 m from, of less than 0.1 m from, preferably immediately downstream of the generator of ferrous $Fe^{2+}$ cations; preferably, the chamber for implosion of the cavitation bubbles is positioned in a region in which the ferrous cations are generated;
- preferably, the implosion chamber is positioned downstream of the generator of ferrous $Fe^{2+}$ cations;
- the generator of ferrous cations does not require any contribution of electrical energy in order to operate;
- the generator of ferrous cations comprises, is preferably composed of, a cell of "Daniell" type between iron and a first electrically conductive material exhibiting a greater electrode potential than iron;
- the first electrically conductive material is chosen from the group consisting of graphite, graphene, stainless steels, nickel alloys, silver, platinum and gold;
- preferably, the first electrically conductive material is graphite, graphene, a stainless steel or a nickel-based alloy, in particular a hastelloy or an inconel;
- the galvanic couple is obtained between two bodies made of iron and made of said first electrically conductive material, respectively, connected electrically to one another by contact and via said liquid to be treated (constituting an electrolyte); the bodies are preferably monobloc bodies, that is to say are not powders;

the generator of ferrous cations is positioned, preferably downstream, at a distance of less than 2 meters, preferably of less than 1 meter, preferably of less than 0.5 meter, preferably of less than 0.3 meter, preferably of less than 0.1 meter, from the cavitation generator, indeed even in contact with the cavitation generator;

the oxygen-based fluid is air and/or hydrogen peroxide and/or ozone;

the oxygen-based fluid is preferably a gas and/or an aqueous hydrogen peroxide solution;

the chamber for implosion of the cavitation bubbles is positioned in a region in which the liquid contains said oxygen-based constituent;

the injection device is positioned upstream of the cavitation generator and/or of the generator of ferrous $Fe^{2+}$ cations;

the injection device is preferably positioned at a distance of less than 0.5 m, of less than 0.3 m, of less than 0.1 m, from the cavitation generator and/or from the generator of ferrous $Fe^{2+}$ cations;

the injection device is preferably a microbubbler capable of introducing, into the liquid, microbubbles of the oxygen-based fluid exhibiting a diameter of less than 100 µm, preferably of less than 75 µm, and preferably of greater than 25 µm, preferably of greater than 50 µm;

the microbubbler comprises a porous block and an injector suitable for injecting said oxygen-based fluid through the porous block into the liquid;

the porous block is a sintered material, preferably made of copper alloy, or made of stainless steel, for example made of PSS' from Pall Corporation;

the flow rate for injection of the microbubbles generated by the microbubbler is greater than 0.01% and/or less than 1%, less than 0.5%, less than 0.1% (V/V), with respect to the flow rate of liquid to be treated;

the cavitation generator and/or the implosion chamber and/or the generator of ferrous cations are incorporated in a hydrodynamic reactor;

preferably, the hydrodynamic reactor comprises first channels, preferably delimited internally by a dielectric material, more preferably put into a block made of said dielectric material, which emerge downstream in an intermediate chamber, the passage of the liquid through the first channels bringing about its acceleration and the generation of said bubbles, said intermediate chamber constituting said implosion chamber;

preferably, and in particular if the intermediate chamber is not delimited internally by iron, the hydrodynamic reactor comprises, preferably upstream of the first channels, second channels delimited internally by iron;

preferably, the hydrodynamic reactor comprises a housing composed, at least partially, of said first electrically conductive material, so as to constitute a galvanic couple with the iron;

the first channels and/or the second channels exhibit a convergent and then divergent longitudinal section;

the hydrodynamic reactor comprises one, preferably two, indeed even more than two, "improved" reaction modules, each improved reaction module being composed, from the upstream toward the downstream, of an optional upstream chamber, a second block comprising a plurality of second channels delimited internally, at least partially, preferably completely, by iron, preferably an intermediate chamber, a first block comprising a plurality of first channels, the passage of the liquid through the first channels bringing about its acceleration and the generation of cavitation bubbles, and a downstream chamber, the passage of the liquid through the downstream chamber causing it to slow down and causing the implosion of the cavitation bubbles;

the passage of the liquid through said second channels brings about the acceleration of the liquid and the generation of cavitation bubbles and, preferably, the second channels of an improved reaction module emerge in an intermediate chamber capable of bringing about the implosion of the cavitation bubbles generated in said second channels;

preferably, the hydrodynamic reactor comprises several successive improved reaction modules, so that the first channels of a first improved reaction module emerge in a downstream chamber constituting the upstream chamber of a second improved reaction module immediately downstream of the first improved reaction module;

in one embodiment, the hydrodynamic reactor comprises one, preferably two, indeed even more than two, "simplified" reaction modules, each simplified reaction module being composed, from the upstream toward the downstream, of a block comprising channels at least partially, preferably completely, delimited by iron and shaped in order to bring about the generation of cavitation bubbles, and an implosion chamber positioned downstream of said channels and shaped in order to bring about an implosion of the cavitation bubbles;

the housing at least partially delimits an intermediate chamber and/or contains one, preferably all, the reaction moduli, which are optionally simplified;

the treatment device comprises a circulation pump which entrains the liquid through the microbubbler and the reaction modulus/moduli, which are optionally simplified;

the microbubbler is positioned downstream of the circulation pump, at a distance from the pump preferably of less than 1 meter, preferably of less than 0.5 meter, preferably of less than 0.3 meter, preferably of less than 0.1 meter.

The invention also relates to a plant for the treatment of a liquid containing an organic pollutant, said plant comprising a circuit into which are inserted a target and a device for the treatment of said liquid exiting from said target, the treatment device being in accordance with the invention.

A treatment plant according to the invention can also comprise one or more of the following optional characteristics:

The organic pollutant is chosen from the group formed by volatile organic compounds, semivolatile compounds, PCBs, pesticides, herbicides, dioxins, furans, explosives and their decomposition products, humic products and colorants;

The liquid to be treated results from the production of oil or gas, from mining, from hydraulic fracturing, from a metering or from a treatment of potable or nonpotable water;

The liquid to be treated exhibits a chemical oxygen demand (COD) of greater than 100 mg/l, of greater than 1000 mg/l, of greater than 5000 mg/l, of greater than 50 000 mg/l, of greater than 100 000 mg/l, indeed even of greater than 300 000 mg/l;

In order for the liquid to be treated to be able to act as electrolyte between the first electrically conductive material and the iron, the electrical conductivity of the liquid to be treated is preferably greater than 300

μS/cm, greater than 700 μS/cm, greater than 1 mS/cm, greater than 100 mS/cm, indeed even greater than 300 mS/cm;

The target is chosen from the group formed by a reservoir and a basin;

In one embodiment, the liquid circulates as a closed loop in the plant.

Finally, the invention relates to a process for the treatment of a liquid containing an organic pollutant, said process comprising a stage consisting in treating said liquid in a treatment plant according to the invention by circulating it through said treatment device under thermodynamic conditions suitable for generating cavitation and ferrous cations in said treatment device.

DEFINITIONS

The "oxygen-based constituents" are constituents which contain oxygen and which are capable of reacting with the ferrous cations to form hydroxyl radicals.

The term "organic pollutant" is understood to mean a compound, the molecule of which comprises at least one carbon atom and one hydrogen atom, and which can be broken down under the action of the hydroxyl radicals.

Unless otherwise indicated, the iron is substantially pure.

The "upstream" and "downstream" positions are determined with respect to the direction of flow of the liquid during its treatment.

The term "equivalent diameter" of a section of area A refers to the diameter of a circular section of identical area A. For a circular section, the equivalent diameter is thus equal to the diameter.

The term "transverse plane" refers to a plane perpendicular to the main direction of flow of the liquid.

The term "comprising a (an)" should be understood as meaning "comprising at least one", unless otherwise indicated.

The expressions "in particular" or "especially" are synonyms and are not limiting.

BRIEF DESCRIPTION OF THE FIGURES

Other characteristics and advantages of the invention will also become apparent on reading the detailed description which will follow and on examining the appended drawings, provided for illustrative and nonlimiting purposes. In these drawings.

In the different figures, identical or analogous elements have been designated with the same references.

DETAILED DESCRIPTION

Figure 1:
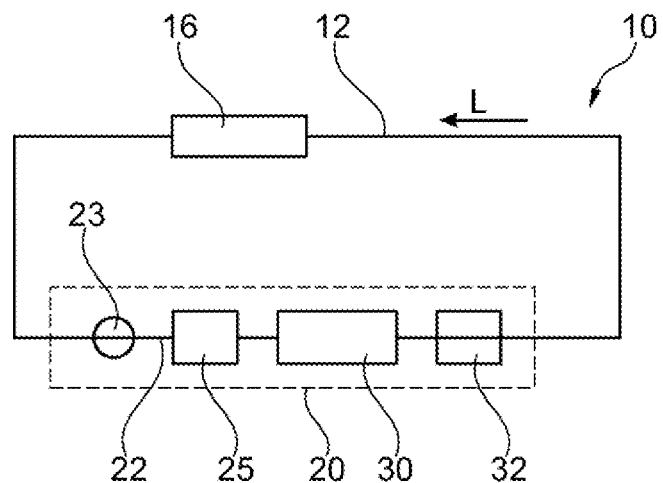
FIG. 1 diagrammatically represents an example of a treatment plant according to the invention.

FIG. 1 represents a plant 10 according to the invention comprising a closed circuit 12 in which a liquid L circulates. The liquid L, which is preferably aqueous, is laden with an organic pollutant to be decomposed. The organic pollutant may in particular be chosen from the group consisting of acetylenes, alcohols, aldehydes, alkanes, aromatic compounds, carboxylic acids, alkenes, in particular chlorinated alkenes, ketones, nitrogenous organic compounds, olefins, phenols, sulfur-based organic compounds, and their mixtures. The liquid may also contain medicines. A target 16, in this case a basin or reservoir for polluted water, and a treatment device 20 according to the invention are inserted into a conduit 22 of the circuit 12.

The circuit 12 can be opened, semi-open or closed, as represented, with or without contribution of liquid, with or without bringing the liquid into contact with the atmosphere.

The target is not limited. The target can especially be in an industrial, residential or service building, for example a hospital, a school or a purification plant.

The treatment device 20 comprises, from the upstream toward the downstream, a pump 23, a microbubbler 25, a hydrodynamic reactor 30 and a filter 32.

The pump 23 is inserted upstream or downstream of the hydrodynamic reactor 30, preferably upstream. It makes it possible to circulate the liquid L.

Figure 2A:
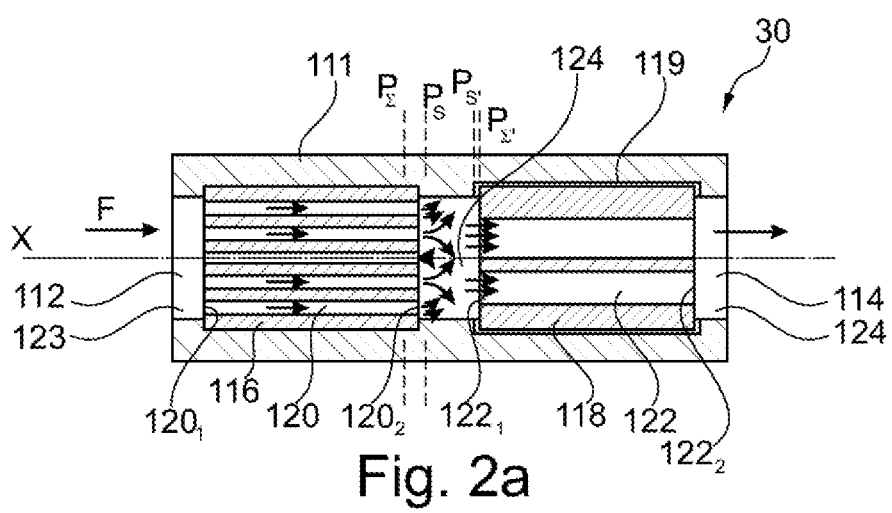
FIGS. 2a and 2b, 4 and 5 represent, in longitudinal section, examples of hydrodynamic reactors which can be used in a treatment device according to the invention.

FIG. 2a diagrammatically represents an example of a hydrodynamic reactor 30 which is used to generate cavitation and to generate ferrous cations.

Unlike "sonochemical" reactors and in particular ultrasonic reactors, a hydrodynamic cavitation generator is effective not only for the small volumes of liquid treated in the laboratory but also for high volumes, such as those encountered in the industry. In addition, the treatment device may advantageously operate with a very low contribution of energy.

Furthermore, advantageously, hydrodynamic cavitation may be produced very simply, by passing a liquid through a constriction, such as a perforated plate, a Venturi, an orifice or a simple throttle valve.

The constriction may also be at the periphery of the pipe in which the liquid circulates, as in embodiments described in EP 0983116. A peripheral constriction may also be obtained by means of a sphere positioned along the axis of the pipe in which the liquid circulates.

The hydrodynamic reactor represented, of longitudinal axis X, comprises a housing 111 provided with an inlet 112 and an outlet 114. Preferably, it comprises connectors which make possible the connecting of the inlet and/or the outlet to a pipe, for example a flange provided with bolt holes capable of interacting with a corresponding flange of said pipe, or a male or female part to be screwed onto a female or male part, respectively, of said pipe.

The housing 111 contains a first reaction module successively comprising, from the upstream toward the downstream, a first block 116, preferably made of a dielectric material, an intermediate chamber 124 and a second block 118 comprising, preferably consisting of, an anode made of iron.

Preferably, the housing 111 is made of a first electrically conductive material, preferably made of stainless steel, and is electrically isolated from the second block 118, for example by means of an elastomer seal 119.

The first and second blocks are pierced longitudinally with first and second channels, referenced 120 and 122, respectively.

The first channels are preferably parallel to one another, of axis X. They may or may not be rectilinear. The number of first channels is preferably greater than 3, greater than 5, greater than 10, greater than 20, greater than 30 and/or less than 200, less than 150, less than 100, less than 80, preferably less than 60. The channels may have any cross section, for example circular. In one embodiment, the first channels exhibit a substantially uniform cross section over their entire length.

The equivalent internal diameter of the first channels is preferably greater than 2 mm, greater than 10 mm, indeed even greater than 15 mm or greater than 20 mm and/or less than 50 mm, less than 40 mm, less than 35 mm. An equivalent internal diameter of approximately 30 mm is highly suitable.

The length of the first channels is preferably greater than 20 mm, greater than 30 mm, and/or less than 50 mm, preferably less than 40 mm.

The dielectric material is preferably a plastic, for example polytetrafluoroethylene (PTFE), nylon, polypropylene, polyvinyl chloride (PVC) or a blend of these materials. Other dielectric materials, for example ceramics, can also be used. Preferably, these materials are chosen in order to generate, by the circulaton of the liquid, a static electric charge by triboelectrification.

PTFE is the preferred dielectric material. This is because this dielectric material prevents the solid matter of the liquid from adhering to the surface of the dielectric material.

The second channels may or may not be straight. In particular, they may extend along the longitudinal axis of the device. The number of second channels is preferably greater than 2, greater than 3, greater than 5, greater than 10, greater than 20, greater than 30, and/or less than 100, less than 80, less than 60. The second channels may have any cross section, for example circular. In one embodiment, the second channels exhibit a substantially uniform cross section over their entire length.

The equivalent internal diameter of the second channels is preferably greater than 2 mm, greater than 4 mm, indeed even greater than 5 mm, and/or less than 15 mm, less than 13 mm, less than 10 mm, less than 8 mm, indeed even less than 7 mm.

In one embodiment, the equivalent internal diameter of the second channels is greater, indeed even 1.1, 1.5, 2 or 3 times greater, than that of the first channels.

The length of the second channels is preferably greater than 20 mm, greater than 30 mm, and/or less than 50 mm, less than 40 mm.

The second channels are delimited by an internal wall made of iron, positioned along the route of the liquid, so as to create, by a galvanic effect, for example with the first electrically conductive material of the housing, oxidation/reduction phenomena which make it possible to generate ferrous cations which make it possible, via reaction with oxygen-based constituents present in the liquid, to generate hydroxyl radicals. A person skilled in the art knows how to determine pairs of materials which make it possible to obtain such a galvanic effect.

More preferably, the second block consists of said iron. Preferably, it constitutes a sacrificial anode which, preferably, may be replaced.

The first channels emerge upstream, toward the inlet 112, in the upstream chamber 123, via "upstream" openings 120$_1$ and optionally, downstream, in an intermediate chamber 124, preferably cylindrical, via "downstream" openings 120$_2$.

The upstream chamber and/or the intermediate chamber are preferably common to several first channels, indeed even common to all of the first channels.

Preferably, the first channels do not emerge opposite the second channels, which prevents the liquid exiting from a first channel and having traversed the intermediate chamber from entering into a second channel by following a straight path.

The second channels 122 (preferably all the second channels) emerge upstream in the intermediate chamber 124 via "upstream" openings 122$_1$, and, toward the downstream, toward the outlet 114, in a downstream chamber 125 via "downstream" openings 122$_2$.

Preferably, the upstream chamber and/or the intermediate chamber and/or the downstream chamber are not delimited by iron capable of creating, by a galvanic effect, for example with the first electrically conductive material of the housing, oxidation/reduction phenomena. One or more of them may in particular be delimited by the housing.

The diameter of the upstream chamber 123 and/or of the intermediate chamber 124 and/or of the downstream chamber may, for example, be 270 mm.

Preferably, the length of the upstream chamber and/or of the intermediate chamber and/or of the downstream chamber, measured along the direction of flow and in the Eulerian system of reduced coordinates, is greater than $0.5 * L_1$ and/or less than $2 * 0.5 * L_1$, $L_1$ being the length of said channels downstream of the chamber under consideration.

Preferably, the upstream chamber and/or the intermediate chamber and/or the downstream chamber exhibit a volume of greater than 0.0001 dm$^3$, of greater than 0.001 dm$^3$, of greater than 0.01 dm$^3$, of greater than 0.1 dm$^3$, and/or of less than 20 dm$^3$, of less than 10 dm$^3$, of less than 1 dm$^3$.

The S/Σ ratio may be greater than 2, greater than 5, greater than 10, greater than 20, greater than 50, greater than 100, indeed even greater than 200, and/or less than 1000, less than 500, less than 400, indeed even less than 300, S denoting the section of the chamber under consideration (the intermediate chamber or downstream chamber), measured in a transverse plane immediately downstream of the region in which the channels upstream of said chamber emerge in said chamber;

Σ denoting the sum of the cross sections of said channels, measured in a transverse plane immediately upstream of the region in which they emerge in said chamber.

A high S/Σ ratio advantageously makes possible the creation of a significant backpressure at the mouth of said channels which is very effective in suppressing the cavitation bubbles generated in said channels.

In order to calculate the S/Σ ratio, all the channels which emerge in said chamber, upstream of said chamber, are taken into consideration.

The S'/Σ' ratio:

S' denoting the section of the chamber under consideration (upstream chamber or intermediate chamber), measured in a transverse plane $P_S'$ immediately upstream of the "upstream" openings of the channels which emerge in said chamber, upstream of said chamber;

Σ' denoting the sum of the cross sections of said channels, measured in a transverse plane $P_Σ'$ immediately downstream of these "upstream" openings, is preferably greater than 2, greater than 5, greater than 10, greater than 20, greater than 50, greater than 100, indeed even greater than 200, and/or less than 1000, less than 500, less than 400, indeed even less than 300.

A high S'/Σ' ratio advantageously makes possible a sudden acceleration in the liquid in said channels, which is very effective in generating cavitation.

As the intermediate chamber 124 is of uniform cross section, S'=S.

In order to calculate the S'/Σ' ratio, all the channels concerned are taken into consideration.

If the hydrodynamic reactor comprises several reaction modules, all the chambers of the hydrodynamic reactor may exhibit a substantially identical S/Σ and/or S'/Σ' ratio.

The hydrodynamic reactor constitutes a cavitation generator as it makes possible a reduction in the section for passage of the liquid capable of producing strong turbulence and a very sudden fall in the pressure in the liquid and thus creating, by cavitation, bubbles, in particular by increasing the diameter of the microbubbles injected but also preferably of new bubbles. In order to create cavitation, the hydrodynamic reactors described in the patent EP-B2-680 457, in WO 2011 033476, in EP 0 983 116 or in the French application filed under the number 13 50513 may be envisaged. All these documents are incorporated by way of reference.

The hydrodynamic reactor also constitutes a generator of ferrous cations and of hydroxyl radicals as, by virtue of its iron anode, it can generate ferrous cations capable of reacting with an oxygen-based constituent to create hydroxyl radicals.

The treatment device also comprises a device for injection, into the liquid L, of an oxygen-based fluid intended to react with the ferrous cations to generate hydroxyl radicals.

The oxygen-based fluid is preferably air and/or oxygen and/or ozone, and/or an aqueous hydrogen peroxide solution.

Preferably, the liquid is accelerated upstream of the injection, for example by means of a diaphragm 156, the reduction in the passage section being adjusted in order to provide, by the Venturi effect, an appropriate injection flow rate.

Preferably, the injection device is positioned downstream of the pump 23, at a distance from the hydrodynamic reactor preferably of less than 1 meter, preferably of less than 0.5 meter, preferably of less than 0.3 meter, preferably of less than 0.1 meter. Preferably, it is positioned immediately upstream of the hydrodynamic reactor.

The injection device may especially take the form of a microbubbler 25, preferably positioned upstream of the hydrodynamic reactor. The microbubbler 25 may or may not be incorporated in the housing 11.

Figure 3:
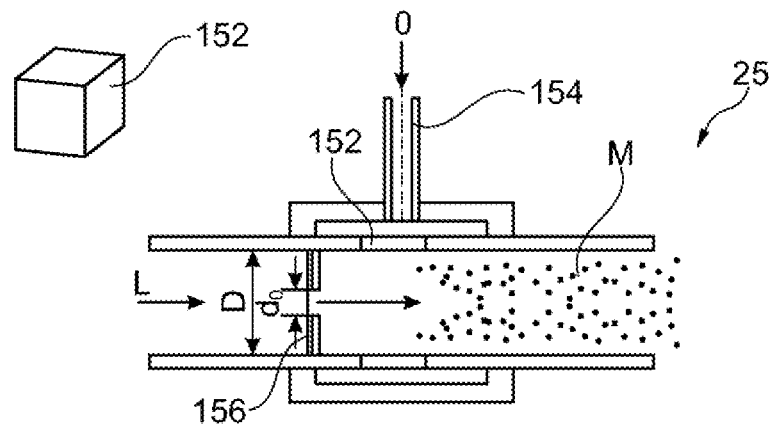
FIG. 3 represents a microbubbler which can be employed in a treatment device according to the invention.

As represented in FIG. 3, the microbubbler may comprise a porous block 152, for example sintered, for example made of copper alloy or of stainless steel, and an injector 154, the porous block being in contact with the liquid L and the injector 152 being arranged in order to allow injection of an oxygen-based gas O into the circuit 12. The porosity is preferably determined in order to give the injected microbubbles M a size so that they exhibit a diameter of less than 100 µm, preferably of less than 75 µm, and/or preferably of greater than 25 µm, preferably of greater than 50 µm.

A treatment device according to the invention can also comprise means for separating the suspended particles, for example means for separation by settling or a filter 32, preferably positioned downstream of the hydrodynamic reactor. The filtration makes it possible to remove the products resulting from mineralization and/or advanced oxidation. It improves the quality of the liquids and thus protects the items of equipment and limits the risk of scaling, of sludging and of corrosion, and also the bioproliferation of microorganisms, such as algae or bacteria.

The filter may in particular be chosen from the group formed by a brush filter, a disk filter, a granular media filter, an ultrafiltration membrane, a nanofiltration membrane, in particular alone or downstream of an ultrafiltration membrane, a cartridge filter, a bag filter, a screen filter and a reverse osmosis membrane.

Operation

The operation of the plant described above is as follows:
The liquid L is entrained by the pump 23 in the circuit 12. At the pump outlet, it is charged with microbubbles of oxygen-based fluid by the microbubbler 25. In one embodiment, only air is injected by the microbubbler 25. Advantageously, the injection of oxygen-based fluid considerably increases the generation of hydroxyl radicals.

The liquid L enters the housing 11, in which its flow is modified in order to create turbulent flow capable of locally creating cavitation.

More specifically, the liquid to be treated enters the housing 11 via the inlet 112 (arrow F represented in FIG. 2a) and the upstream chamber 123.

The liquid then passes in transit through the first channels 120 put into the first block 116.

The entry into the first channels is accompanied by a sudden acceleration of the liquid and by a decrease in the pressure which result in the appearance of cavitation. The operating conditions (flow rate, pressure) are determined in order for the reduction in pressure to bring about cavitation. With an Ionscale Buster® hydrodynamic reactor, the velocity of the liquid at the inlet of the hydrodynamic reactor (in the upstream chamber 123) is preferably greater than 2 m/s and/or less than 15 m/s, less than 12 m/s, less than 10 m/s, less than 8 m/s, indeed even less than 6 m/s, indeed even less than 4 m/s, and the pressure at the inlet of the hydrodynamic reactor is preferably greater than 1 bar and/or less than 20 bar, less than 10 bar, indeed even less than 5 bar.

The book "Cavitation and Bubble Dynamics" by Christopher Earls Brennen, published by Oxford University Press, 1995, describes the conditions which make it possible to obtain hydrodynamic cavitation. The cavitation depends on numerous factors, the main ones of which are:
the tension of the gas or gases dissolved in the liquid;
the nature and the physicochemical characteristics of the gas or gases present in the liquid;
the temperature of the liquid;
the pressure of the liquid;
the geometry of the hydrodynamic reactor;
the flow rate or the velocity of flow of the liquid.

The cavitation results in the formation of cavitation bubbles, filled with gas, inside the liquid and/or on the boundary layer of the walls of the hydrodynamic reactor.

Preferably, the cavitation generator is configured in order to generate bubbles exhibiting, for more than 50% by number, a diameter of between 25 µm and 2 mm.

Advantageously, the very intense local mechanical and thermodynamic conditions generated by the cavitation also result in the destruction of certain pathogenic or nonpathogenic microorganisms which might be present within the liquid.

In the first channels, the liquid rubs over the dielectric material. The rubbing of the liquid over the dielectric material brings about the accumulation of electrostatic charges at the surface of said dielectric material, thus generating a local electrostatic field capable of promoting the following reactions:
physicochemical precipitation of certain ions, such as certain oxides of metals, carbonates, sulfates or phosphates;
coagulation of certain colloidal particles.

By virtue of the presence of the electrostatic effect generated by the dielectric material and of the coagulation of the colloidal particles which results therefrom, the size of the agglomerates of colloidal particles may reach a size sufficient for them to be efficiently and economically retained in a filter.

The two-phase fluid then emerges in the intermediate chamber 124, which constitutes an implosion chamber. This is because the entry into the intermediate chamber 124 results in a decrease in the velocity, in a sudden increase in the pressure and in condensation within the cavitation bubbles, which brings about the implosion of most of the cavitation bubbles.

These very sudden implosions result in the formation of shockwaves which in their turn generate physicochemical or thermodynamic and mechanical phenomena, such as the bursting of any matter occurring close to the bubbles which implode.

Thus, during the smashing of the cavitation bubbles, very high pressures and very high local temperatures are reached: the temperature within the bubbles may thus reach values of the order of 5000° C. and the pressure may reach values of the order of 500 kg/cm$^2$ (K. S. Suslick, Science, Vol. 247, 23 Mar. 1990, pp. 1439-1445).

Furthermore, a process of emulsification, of homogenization and of dispersion may be obtained by virtue of the kinetic energy generated by the implosions of the cavitation bubbles.

These temperature and pressure conditions activate, inside a bubble or in the liquid in the vicinity of said bubble, physicochemical and thermodynamic reactions, in particular the production of hydroxyl radicals and the precipitation of inorganic salts, in particular carbonates, sulfates and phosphates.

The hydrodynamic conditions prevailing in the intermediate chamber 124 also contribute to the coagulation by providing high stirring of the liquid. It is thus particularly advantageous for the intermediate chamber to be downstream of the dielectric material, which initiates the coagulation.

The intermediate chamber 124 separates the "downstream" openings of the first channels from the "upstream" openings of the second channels.

The liquid exiting from the intermediate chamber 124 thus enters the second channels 122 of the second block 118. Preferably, the second channels are not, however, aligned axially with the first channels in order to promote turbulence and subsequent precipitation.

The penetration of the liquid into the second channels 122 results in a sudden acceleration in its velocity. The region of transition between the intermediate chamber 124 and the second channels 122 thus constitutes a region of acceleration of the flow and preferably of appearance of cavitation.

The "Daniell"-type "cell" effect generated by the iron-graphite or iron-stainless steel electrogalvanic couple brings about release of ferrous $Fe^{2+}$ cations within the liquid, as a result of the electrolytic reaction which is spontaneously established between the iron anode and the less reducing metals of the plant, in this case graphite, graphene, or the stainless steel constituting the housing.

Surprisingly again, the conditions created by the implosion of the cavitation bubbles increase the generation of hydroxyl radicals, that is to say the effectiveness of the reaction of the ferrous cations with the oxygen-based constituent. It is thus advantageous for the implosion of the cavitation bubbles to be carried out in a region in which the ferrous cations react with the oxygen-based constituent.

The inventors have found that the implosions in the intermediate chamber have an effect on the generation of hydroxyl radicals, although the intermediate chamber is upstream of the second channels in which the ferrous cations are generated.

The efficiency of the treatment device thus makes it possible to obtain reactions of the Fenton type with a limited addition of hydrogen peroxide, indeed even without addition of hydrogen peroxide, generally regarded as harmful to the health and the environment.

In addition, the ferrous cations may advantageously be generated without contribution of electrical energy. In one embodiment, the device however comprises an electric generator capable of adding ferrous cations to the liquid. The efficiency of the treatment is thereby improved.

The very reactive hydroxyl radicals then react with the molecules of the organic compounds to dissociate them and to thus reduce the pollution.

In one embodiment, a plant according to the invention comprises, downstream, upstream or in parallel to the treatment device according to the invention, a biological treatment unit in order to reduce the pollution even more.

At the outlet of the second block 118, the liquid enters the downstream chamber 125, which makes it possible again to implode the cavitation bubbles.

After having left the hydrodynamic reactor, the liquid passes through the filter 32, which makes it possible to retain, at least in part, the particles mineralized by the advanced oxidation carried out in the hydrodynamic reactor and other particulate pollutants which might be harmful to the plant. The liquid subsequently continues its journey toward the target 16.

The treatment device represented in FIG. 2a is highly suitable when the liquid to be treated may pass through it several times. The liquid entering the first channels is then advantageously laden with ferrous cations.

Figure 2B:
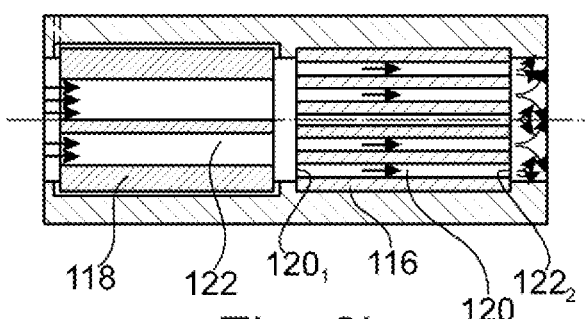

The treatment device represented in FIG. 2b is an improved treatment module which is an alternative form of the treatment device represented in FIG. 2a in which the first and second blocks are inverted. This embodiment is preferred because, from the first passage of the liquid, the liquid entering the first block in order to undergo cavitation is already laden with ferrous cations.

The treatment device according to the invention may be used in all the applications in which a liquid comprises an organic pollutant and in particular in the abovementioned applications or applications described in the abovementioned patents and patent applications.

As is clearly apparent now, the invention provides a treatment solution while limiting recourse to chemical additives and in particular hydrogen peroxide, iron sulfate and/or the iron filings conventionally introduced in Fenton processes. This solution is applicable over a wide pH range of the liquid to be treated and has proved to be particularly effective.

In particular, the housing 111 might contain several improved reaction modules, the downstream chamber of a first improved reaction module corresponding to the upstream chamber of a second improved reaction module, positioned immediately downstream of the first improved reaction module.

Figure 4:
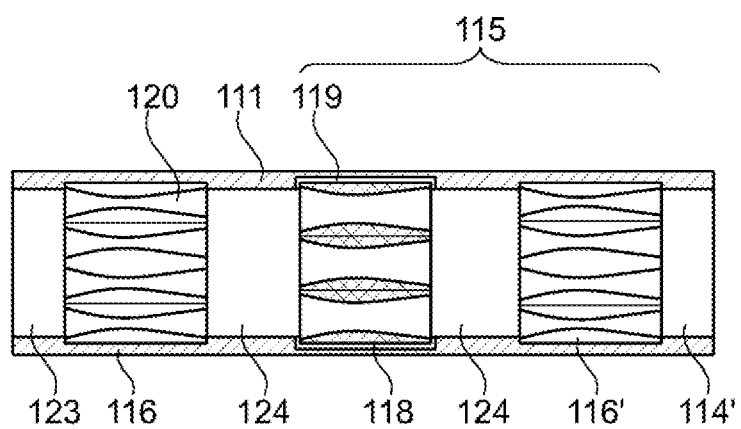

FIG. 4 represents a particularly advantageous embodiment. According to this embodiment, the housing 111 comprises an improved reaction module 115 comprising a second block 118 and, downstream of the second block 118, a first block 116', preferably substantially identical to the first block 116. The intermediate chamber 124 acts as upstream chamber for the first block 116'. Downstream of the first block 116', the hydrodynamic reactor comprises a downstream chamber 114'.

In this embodiment, the first channels and the second channels exhibit a convergent and then divergent longitudinal section which is particularly effective.

This embodiment also illustrates that the number of second blocks may be different from the number of first blocks.

Figure 5:
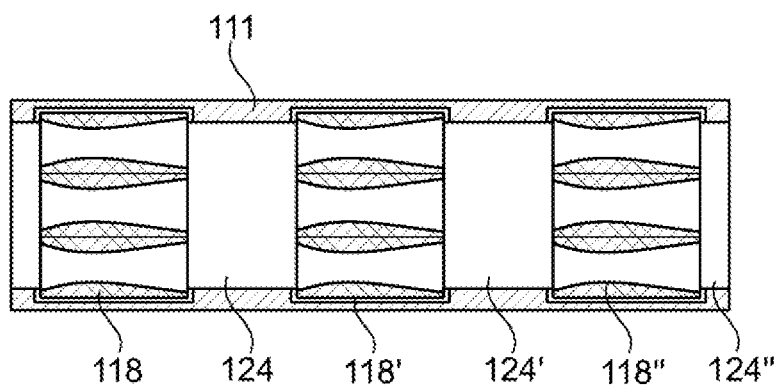

FIG. 5 illustrates another alternative form of a hydrodynamic reactor according to the invention. This reactor comprises three simplified reaction modules, each simplified reaction module comprising a second block made of iron, referenced 118, 118' and 118", the second channels being shaped in order to create cavitation, and an intermediate chamber, referenced 124, 124' and 124" respectively, constituting a chamber for implosion of the cavitation bubbles created in said second channels.

Of course, the present invention is not, however, limited to the embodiments described and represented.

In particular, the liquid treated may comprise several liquid phases, indeed even comprise solid particles in suspension.

In addition, the number or the shape of the first channels may be different from those of the second channels, the number of first blocks may be identical to or different from the number of second blocks and the number and the shape of the chambers may be diverse.

The second channels may constitute implosion chambers. In one embodiment, the liquid exiting from the first channels directly enters into the second channels, without passing in transit through an intermediate chamber. However, the presence of the intermediate chamber is preferable as it promotes the implosion of the cavitation bubbles.

Preferably, entry into the second channels leads to a decompression (resulting from the reduction in the passage section). Preferably, this decompression is sufficient for the production of the cavitation bubbles, advantageously at the same spot where the ferrous cations are generated.

The first channels are not necessarily made of a dielectric material. In one embodiment, the first channels are delimited internally, at least partially, preferably completely, by iron.

New Developments

An example of the use of hydrodynamic cavitation is presented in the work of Pandit A. B. and Moholkar V. S. which appeared in the pages of "Chemical Engineering Progress", July 1996, pp. 57-69. However, the inventors have found that the hydrodynamic cavitation systems are not optimal. In particular, the intensity of the chemical reactions is reduced thereby and the heating of the medium increased.

The continuation of the research studies has led them to new improvements.

In an improved embodiment, the invention thus relates to a device for the treatment of a liquid comprising an organic pollutant, said device comprising:
  an injection device capable of introducing, into the liquid, microbubbles of an oxygen-based fluid exhibiting a diameter of less than 120 µm, preferably of less than 100 µm, and preferably of greater than 25 µm, preferably of greater than 40 µm, preferably of greater than 50 µm, said oxygen-based fluid containing an oxygen-based constituent capable of reacting with ferrous $Fe^{2+}$ cations in order to generate hydroxyl radicals,
  a cavitation generator capable of generating, by cavitation, bubbles within said liquid,
  a chamber for implosion of said bubbles,
  a generator of ferrous $Fe^{2+}$ cations,
the chamber for implosion of the cavitation bubbles being positioned in a region in which the liquid contains said ferrous cations.

Especially in this improved embodiment, a treatment device according to the invention may also comprise one or more of the following optional characteristics:
  the injection device is configured so that:
    the microbubbles exhibit, as arithmetic mean, a diameter of less than 100 µm and/or preferably of greater than 40 µm, and/or
    more than 80% by number of the microbubbles injected exhibit a diameter of between 40 µm and 120 µm, and/or
    the difference between the maximum size of the microbubbles injected and the minimum size of the microbubbles injected is less than 20 µm;
  the treatment device comprises a backpressure valve downstream of the cavitation generator;
  the injector of microbubbles and the pressure-regulating valve are adjusted so that the maximum radius of the cavitation bubbles is less than the critical radius of the cavitation bubbles, preferably so that the maximum radius of the cavitation bubbles is less than 0.9 times the critical radius of the cavitation bubbles;
  the cavitation generator is a hydrodynamic reactor and/or the generator of ferrous cations is a cell of "Daniell" type between iron and a first electrically conductive material exhibiting a greater electrode potential than iron;
  the cathode of said cell comprises graphite.

The treatment device of the improved embodiment may, of course, comprise one or more of the characteristics described in the part of the present description which precedes the title "New developments".

During the new developments, the inventors have in particular discovered that an oscillation of the bubbles exiting from the cavitation generator promotes the generation of hydroxyl radicals. They have subsequently searched into what parameters might optimize the positive effect of this oscillation and if there existed relationships between these parameters.

The inventors first discovered the advantage of injecting calibrated microbubbles.

Preferably, the microbubbles injected have a median size of less than 100 µm, preferably of less than 70 µm, preferably of less than 50 µm, preferably of less than 40 µm, preferably of less than 30 µm. To this end, it is preferable for the injection device to comprise a microbubbler comprising a porous block of suitable porosity.

The injection of microbubbles greatly promotes the generation of bigger bubbles in the cavitation generator, which increases the duration of oscillation of these bubbles and thus their effectiveness in generating hydroxyl radicals.

Preferably, more than 80%, more than 90%, more than 95%, indeed even substantially 100%, by number of the microbubbles injected exhibit a diameter of greater than 25 µm, preferably of between 40 µm and 120 µm, preferably of between 50 µm and 100 µm.

Preferably, the diameter of the microbubbles injected is substantially constant. Preferably, the difference between the maximum size of the microbubbles injected and the minimum size of the microbubbles injected is less than 30 µm, preferably less than 20 µm.

Furthermore, the inventors have observed that a hydrodynamic cavitation generator makes possible an oscillation of the bubbles at a more efficient frequency than that obtained with "sonochemical" reactors.

The studies have also demonstrated that a generator of ferrous $Fe^{2+}$ cations employing a Fenton process, hereinafter "Fenton generator", was particularly well suited.

Preferably the Fenton generator comprises a sacrificial iron anode and, preferably, a graphite cathode or a cathode comprising graphene, indeed even consisting of graphene.

The Fenton generator is preferably a "galvano-Fenton" generator, which operates passively, without injection of current, unlike a "electro-Fenton" generator, which requires injection of electric current by means of an electric generator.

In a preferred galvano-Fenton generator, the electrochemical reduction reaction at the graphite cathode ($O_2+2H^++2e^-\rightarrow H_2O_2$) generates, continuously and in situ, hydrogen peroxide (oxidizing agent), whereas the oxidation reactions at the iron anode ($Fe\rightarrow Fe^{2+}+2e^-$ and $Fe\rightarrow Fe^{3+}+3e^-$) produces coagulating agents ($Fe^{2+}/Fe^{3+}$).

The coagulating agents promote the separation by settling of the pollutants.

The presence of the $Fe^{2+}$ ions makes it possible to generate hydroxyl radicals (OH°) by Fenton reaction. The hydroxyl radicals, which exhibit a very high oxidation potential, rapidly react with the majority of the organic pollutants present in the liquid treated.

In order to optimize the oscillation of the bubbles, it is also preferable for the treatment device to comprise, downstream from the cavitation generator, preferably at a distance of less than 2 m, preferably of less than 1 m, from the cavitation generator, a pressure-regulating valve, referred to as "backpressure valve". The term "pressure-regulating valve" is understood to mean any device which makes it possible to modify the pressure in the cavitation generator and to preferably allow continuous adjustment.

The pressure-regulating valve is adjusted so as to oscillate the bubbles downstream of the cavitation generator, that is to say so that their radius varies periodically. The inventors have discovered that, the more prolonged the oscillation of the bubbles, the better the effectiveness of the treatment. Preferably, the amplitude of the oscillation is maximized.

Preferably, the pressure-regulating valve is hydraulically controlled.

The Rayleigh-Plesset equation and the van Wijngaarden model, which are well known to a person skilled in the art, make it possible to model this oscillation and thus to determine the parameters which make it possible to optimize it.

In particular, preferably, the device for the injection of microbubbles and the pressure-regulating valve are adjusted so that the maximum radius of the cavitation bubbles obtained is less than the critical radius Rc of the bubbles at the output of the cavitation generator, preferably less than 0.9*Rc.

The inventors have discovered that observing this condition makes it possible to optimize the chemical reactions of the advanced oxidation processes which take place each time that the radius of a bubble decreases. The treatment device is thus much more effective than a device in which the implosion of the bubbles is sudden, for example by contact with an obstacle.

Rc is the radius starting from which a bubble no longer implodes and continues to grow.

$$Rc=(\sigma/2\alpha_s)^{1/3},$$

$\alpha_s$ denoting the void fraction in the medium (liquid+gas), that is to say the ratio of the volume of gas in the medium to the volume of the medium, downstream of the injection device and upstream of the cavitation generator, preferably immediately downstream of the injection device, and σ denoting the cavitation number of the flow.

Rc, $\alpha_s$ and σ are parameters well known to a person skilled in the art, which he fully controls.

For a predetermined injection flow rate, it is possible to evaluate, by measurement or modeling, if the treatment conditions will or will not result in an implosion of the bubbles. By adjusting the pressure-regulating valve, it is thus possible to determine the critical radius.

The void fraction $\alpha_s$ is the percentage of the medium volume occupied by microbubbles. It thus corresponds to the amount of oxygen-based fluid injected with respect to the flow rate of the liquid L to be treated. It is a function, when the diameter of the microbubbles is fixed, of the number of microbubbles per unit of liquid volume. In order to modify the void fraction, it is thus sufficient to increase or reduce the flow rate of oxygen-based fluid injected.

Finally, the cavitation number of the flow σ is equal to (Ps−Pv)/(0.5×ρ×Us),

Ps denoting the pressure of the liquid L upstream of the cavitation generator and being able to be modified by adjusting the pressure-regulating valve, in Pa;

Pv denoting the vapor pressure of the liquid L at 15° C., in Pa,

Us denoting the velocity of the liquid L measured immediately upstream of the cavitation generator (or of the cavitation generator furthest upstream if the treatment device comprises several cavitation generators), preferably at less than 50 cm, preferably measured at less than 10 cm, upstream of said cavitation generator, conventionally measured in the pipe into which the treatment device is inserted;

ρ denoting the density of the liquid in kg/m³.

In order to modify the cavitation number, it is thus sufficient to modify the adjustment of the pressure-regulating valve.

There is known, from EP 0983116 (or U.S. Pat. No. 5,937,906), incorporated by way of reference, a hydrodynamic cavitation device which might be used as cavitation generator in a device according to the present invention, with a proviso of being specifically adjusted in order to promote the oscillation of the bubbles. According to this document, the preferred smashing appears to be "instantaneous", which the conditions recommended above make it possible to prevent.

The following tests illustrate the performances obtained with a device exhibiting the new improvements. These tests were carried out under the same flow conditions, with the same parameters for injection of microbubbles. In the two tests, air microbubbles were injected.

In the two tests, the device comprised the same device for the injection of microbubbles, the same cavitation generator and the same chamber for implosion of the bubbles exiting from the cavitation generator. In the second test, the device also comprised a generator of ferrous $Fe^{2+}$ cations, in the form of a galvano-Fenton having iron anodes and graphite body, unlike the device used for the first test.

The density ρ of the liquid L (water charged with p-nitrophenol) was 1000 kg/m³.

The velocity of the liquid L measured immediately upstream of the cavitation generator, Us, was 10 m/s.

The void fraction $\alpha_s$ (percentage of the medium volume occupied by microbubbles) at the injection was 0.47%.

The radius of the injected microbubbles was 50 μm.

The cavitation number σ was 0.75.

The cavitation generator exhibited a Venturi having a ratio of 0.5.

The following table provides the concentration of hydroxyl radicals OH° generated, as a function of the difference between the pressure of the liquid L upstream from the cavitation generator Ps and the vapor pressure Pv, under the conditions of operation of the cavitation generator.

The OH° concentration was evaluated by the degree of decomposition of p-nitrophenol PNP, assuming that all the OH° radicals are used for this purpose, the $N_2$ reactions being ignored.

| Ps-Pv (MPa) | OH° concentration (mmol/l) without anode | OH° concentration (mmol/l) with Fe/Graphite Fenton | Multiplying factor |
|---|---|---|---|
| 0.1 | 0.153 | 0.510 | ×3.3 |
| 0.2 | 0.158 | 0.606 | ×3.8 |
| 0.3 | 0.216 | 1.029 | ×4.8 |
| 0.4 | 0.302 | 2.014 | ×6.7 |
| 0.5 | 0.291 | 1.532 | ×5.3 |
| 0.6 | 0.212 | 0.885 | ×4.2 |
| 0.7 | 0.148 | 0.494 | ×3.3 |
| 0.8 | 0.111 | 0.370 | ×3.3 |
| 0.9 | 0.088 | 0.295 | ×3.3 |

The device according to the improved invention thus exhibits a noteworthy oxidizing power greater by a factor of between 3 and 6 with respect to that of a device devoid of Fenton generator, which itself exhibits improved performances if it is compared with a device devoid of device for the injection of microbubbles.

Without being restricted by this theory, the inventors explain the results obtained in the following way:

Under an oxygen atmosphere, the phenomenon of cavitation of the water results in the formation of hydroxyl radicals HO. and of hydrogen peroxide $H_2O_2$.

The mechanism comprises a first step of homolytic decomposition of the water and oxygen molecules in the cavitation bubbles under the effect of the high temperatures developed.

The HO., H. and HOO. radicals and also the oxygen atoms (O) are then formed:

$$H_2O \rightarrow H. + HO. \quad (I.1)$$

$$O_2 \rightarrow 2O \quad (I.2)$$

$$HO. + O \rightarrow HOO. \quad (I.3)$$

$$O + H_2O \rightarrow 2HO. \quad (I.4)$$

The capture of the H. radicals by the oxygen atoms and molecules in the bubble and at the surface leads to an increase in the concentration of the HO. and HOO. radicals:

$$H. + O \rightarrow HO. \quad (I.5)$$

$$H. + O_2 \rightarrow HOO. \quad (I.6)$$

$$H. + H_2O \rightarrow HO. + H_2 \quad (I.7)$$

The majority of these radicals will combine together in the gas phase, that is to say inside the bubble, to reform the water, the oxygen and the oxygen atoms:

$$H. + OH. \rightarrow H_2O \quad (I.8)$$

$$2OH. \leftrightarrows O + H_2O \quad (I.9)$$

$$2O \rightarrow O_2 \quad (I.10)$$

$$HO. + HOO. \rightarrow O_2 + H_2O \quad (I.11)$$

The inventors have estimated that approximately 10% of the hydroxyl radicals formed diffuse toward the liquid and approximately 90% of the hydroxyl radicals formed combine together at the interface of the cavitation bubbles to form $H_2$ and $H_2O_2$ according to the following reactions:

$$H. + H. \rightarrow H_2 \quad (I.12)$$

$$HO. + HO. \rightarrow H_2O_2 \quad (I.13)$$

$$2HOO. \rightarrow H_2O_2 + O_2 \quad (I.14)$$

$$2HO. + 2O \rightarrow O_2 + H_2O_2 \quad (I.15)$$

The presence of the generator of ferrous $Fe^{2+}$ cations makes use of the product of these hydroxyl reactions to generate a large amount of new hydroxyl radicals, referred to as "secondary" hydroxyl radicals, which makes it possible to increase the efficiency of the treatment.

Advantageously, the generator of ferrous $Fe^{2+}$ cations also makes it possible to produce $Fe^{2+}/Fe^{3+}$ coagulants.

As is clearly apparent now, the invention thus provides a combination of three components, namely:
- an injector of microbubbles,
- a cavitation generator, and
- a generator of ferrous $Fe^{2+}$ cations.

These three components, positioned successively from the upstream toward the downstream, interact closely for a common result, namely the generation of a large number of hydroxyl radicals and finally a maximum treatment efficiency.

More specifically, the injection of microbubbles makes it possible to generate far more oscillating bubbles than the cavitation alone of the liquid would produce. This is because the microbubbles act as seeds which facilitate the generation of oscillating bubbles in the cavitation generator. The bubbles oscillated in the cavitation generator act like so many microreactors producing hydroxyl radicals at each oscillation. The injection of microbubbles thus has a determining effect on the production of hydroxyl radicals.

The optimization of the critical radius of the oscillating bubbles promotes the oscillation and thus the number of hydroxyl radicals generated by each bubble.

Finally, the oscillation of the bubbles produces hydrogen peroxide. By converting this hydrogen peroxide, the generator of ferrous cations increases the number of hydroxyl radicals tenfold.

The combination of an injection of microbubbles, of a cavitation generator parameterized to promote the oscillation of the bubbles at the outlet of the cavitation generator and of a generator of ferrous $Fe^{2+}$ cations results in noteworthy performances. In particular, it makes it possible for the treatment device to produce reactive radicals in situ, with regard to large volumes of liquid, with little or nothing in the way of chemical products, with a very high, indeed even complete, mineralization of the pollutants and with very rapid decomposition kinetics.

A treatment device according to the invention can especially be used to treat liquids laden with organic matter but also the water from the primary circuits of nuclear power plants or more generally aqueous liquids contaminated by radioactive metal ions. This is because a treatment device according to the invention makes it possible to precipitate and coagulate this contamination and then to extract it from the liquid.

The invention claimed is:

1. A treatment device for the treatment of an aqueous liquid comprising an organic pollutant, said treatment device comprising:
    an injection device capable of introducing, into the liquid, microbubbles of an oxygen-based fluid exhibiting a diameter of less than 120 μm and greater than 25 μm, said oxygen-based fluid containing an oxygen-based constituent capable of reacting with ferrous Fe2+ cations in order to generate hydroxyl radicals, a cavitation generator downstream of the injection device and capable of generating, by cavitation, bubbles within said liquid, a pressure-regulating valve downstream of the cavitation generator, a chamber for implosion of said bubbles, a generator of ferrous Fe2+ cations, the chamber for implosion of the cavitation bubbles being positioned in a region in which the liquid contains said ferrous cations, and the injection device and the pressure-regulating valve being adjusted so that the maximum radius of the cavitation bubbles is less than the critical radius of the cavitation bubbles.

2. The treatment device as claimed in claim 1, in which the injection device is configured so that:

the microbubbles exhibit, as arithmetic mean, a diameter of less than 100 μm and greater than 40 μm, and/or more than 80% by number of the microbubbles injected exhibit a diameter of between 40 μm and 120 μm, and/or the difference between the maximum diameter of the microbubbles injected and the minimum diameter of the microbubbles injected is less than 20 μm.

3. The treatment device as claimed in claim 1, in which the microbubbles injected exhibit a diameter of less than 100 μm.

4. The treatment device as claimed in claim 1, in which the injection device is a microbubbler.

5. The treatment device as claimed in claim 1, in which the injector of microbubbles and the pressure-regulating valve are adjusted so that the maximum radius of the cavitation bubbles is less than 0.9 times the critical radius of the cavitation bubbles.

6. The treatment device as claimed in claim 1, in which the cavitation generator is a hydrodynamic reactor and/or the generator of ferrous cations is a cell of "Daniell" type between iron and a first electrically conductive material exhibiting a greater electrode potential than iron.

7. The treatment device as claimed in claim 6, in which the cathode of said cell comprises graphite and/or graphene.

8. The treatment device as claimed in claim 1, in which the cavitation generator and/or the generator of ferrous cations are incorporated in a hydrodynamic reactor comprising:

first channels, constituting the cavitation generator, which emerge downstream in an intermediate chamber, the passage of the liquid through the first channels bringing about its acceleration and the generation of said bubbles, said intermediate chamber constituting said implosion chamber;

second channels, constituting the generator of ferrous Fe2+ cations, emerging upstream in said intermediate chamber, the second channels being delimited internally by iron.

9. The treatment device as claimed in claim 1, in which the oxygen-based fluid is air and/or hydrogen peroxide and/or ozone.

10. The treatment device as claimed in claim 1, comprising a plurality of "improved" reaction modules, each improved reaction module being composed, from the upstream toward the downstream, of:

an optional upstream chamber, a second block comprising a plurality of second channels delimited internally, at least partially, by iron, said second block constituting the generator of ferrous Fe2+ cations, optionally an intermediate chamber, a first block comprising a plurality of first channels, the passage of the liquid through the first channels bringing about its acceleration and the generation of cavitation bubbles, said first block constituting the cavitation generator, and a downstream chamber, the passage of the liquid through the downstream chamber causing it to slow down and causing the implosion of the cavitation bubbles.

11. The treatment device as claimed in claim 1, comprising a "simplified" reaction module composed, from the upstream toward the downstream, of a block comprising channels at least partially delimited by iron and shaped in order to bring about the generation of cavitation bubbles, said block constituting the cavitation generator and the generator of ferrous Fe2+ cations, and an implosion chamber positioned downstream of said channels and shaped in order to bring about an implosion of said cavitation bubbles generated in said channels at least partially delimited by iron.

12. A plant for the treatment of a liquid containing an organic pollutant, said plant comprising a circuit into which is inserted a target and a device for the treatment of said liquid exiting from said target, the treatment device being in accordance with claim 1 and the liquid to be treated containing an oxygen-based constituent capable of reacting with said ferrous cations in order to generate hydroxyl radicals.

13. The plant as claimed in claim 12, in which:

the organic pollutant is chosen from the group formed by volatile organic compounds, semivolatile compounds, PCBs, pesticides, herbicides, dioxins, furans, explosives and their decomposition products, humic products and colorants; and/or the liquid to be treated results from the production of oil or gas, from mining, from hydraulic fracturing, from a metering or from a treatment of potable or nonpotable water; and/or the liquid to be treated exhibits a chemical oxygen demand of greater than 100 mg/l.

14. A process for the treatment of a liquid containing an organic pollutant, said process comprising a stage consisting in treating said liquid in a plant as claimed in claim 12 by circulating it through said treatment device under thermodynamic conditions suitable for generating cavitation and ferrous cations.

* * * * *